(12) United States Patent
Terashima

(10) Patent No.: US 8,750,698 B2
(45) Date of Patent: Jun. 10, 2014

(54) LENS CONTROL DEVICE AND LENS CONTROL METHOD

(71) Applicant: Fujifilm Corporation, Tokyo (JP)

(72) Inventor: Masayuki Terashima, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 14/036,767

(22) Filed: Sep. 25, 2013

(65) Prior Publication Data

US 2014/0023355 A1 Jan. 23, 2014

Related U.S. Application Data

(63) Continuation of application No. PCT/JP2012/057330, filed on Mar. 22, 2012.

(30) Foreign Application Priority Data

Mar. 25, 2011 (JP) ................................. 2011-067889

(51) Int. Cl.
*G03B 17/00* (2006.01)
(52) U.S. Cl.
USPC ........................................................... 396/87
(58) Field of Classification Search
USPC ........................................................... 396/87
See application file for complete search history.

(56) References Cited

U.S. PATENT DOCUMENTS

| 7,102,686 | B1 * | 9/2006 | Orimoto et al. | 348/375 |
| 2009/0060273 | A1 * | 3/2009 | Stephan et al. | 382/103 |
| 2011/0118608 | A1 * | 5/2011 | Lindner et al. | 600/474 |
| 2013/0128002 | A1 * | 5/2013 | Muramatsu | 348/47 |
| 2013/0170029 | A1 * | 7/2013 | Morita et al. | 359/464 |

FOREIGN PATENT DOCUMENTS

| JP | 63-099693 | 4/1988 |
| JP | 11-027702 | 1/1999 |

OTHER PUBLICATIONS

International Search Report, PCT/JP2012/057330, Jun. 12, 2012.
Written Opinion, PCT/ISA/237, Jun. 12, 2012.

* cited by examiner

*Primary Examiner* — Clayton E LaBalle
*Assistant Examiner* — Linda B Smith
(74) *Attorney, Agent, or Firm* — Young & Thompson

(57) ABSTRACT

A first lens device (10A) for 3D image taking and a second lens device (10B) which is made usable for 3D image taking when connected to the first lens device are used. A common zoom range of the first lens device and the second lens device is set. Common brightness control ranges of the first lens device and the second lens device are set at respective focal lengths included in the common zoom range. A zoom position signal corresponding to a target focal length of the first lens device included in the common zoom range and a brightness control signal corresponding to target brightness of the first lens device at the target focal length included in the common brightness control range is sent from the first lens device to the second lens device.

9 Claims, 6 Drawing Sheets

LENS CONTROL DEVICE AND LENS CONTROL METHOD

CROSS REFERENCE TO RELATED APPLICATION

This is a continuation of International Application No. PCT/JP2012/057330 filed on Mar. 22, 2012, and claims priority from Japanese Patent Application No. 2011-067889 filed on Mar. 25, 2011, the entire disclosure of which is incorporated herein by reference.

TECHNICAL FIELD

The present invention relates to a lens control device and a lens control method for controlling plural lens devices provided in a 3D camera which takes a 3D image.

BACKGROUND ART

Camera systems have been proposed which take a 3D image by taking right-eye and left-eye parallax images using two lens devices disposed in parallel. The two lens devices used in such camera systems are driven simultaneously so that sets of optical conditions which are varied by a focusing control, a zooming control, an iris control, etc. are always kept identical. In general, the right-eye and left-eye lens devices of such camera systems are completely identical in terms of the lens specification.

That is, to take a 3D image, it is necessary to prepare two completely identical lens devices. Even if a user owns plural lens devices, the lens devices cannot be used for taking of a 3D image as they are.

In this connection, the 3D shooting system disclosed in Patent document 1 is known as a camera system which uses various lenses for 3D and equalizes zoom positions (focal lengths).

The 3D image taking system disclosed in Patent document 2 is known as a camera system which performs iris controls on left and right lens devices on the basis of images taken to equalize brightness levels of images obtained from the left and right lens devices.

PRIOR ART DOCUMENTS

Patent Documents

Patent document 1: JP-A-11-027702
Patent document 2: JP-A-63-099693

SUMMARY OF THE INVENTION

Problems to Be Solved by the Invention

As described above, when a user wants to take a 3D image, he or she prepares two (left and right) lens devices. When it is attempted to take a 3D image by combining a lens device that is designed for 3D image taking with an arbitrary, existing lens device of a different kind, a camera system cannot make adjustments between lenses in advance because what kind of existing lens device will be connected is unknown.

In the 3D shooting system disclosed in Patent document 1, although zoom positions of various 3D lens devices are equalized, it is not intended to combine a lens device that is designed for 3D image taking with an existing lens device of a different kind. Furthermore, no consideration is given to the fact that even if zoom positions are equalized, depending on the zoom position there may occur an event that at a certain brightness level one lens device enables shooting but the other does not.

In the 3D image taking system disclosed in Patent document 2, merely the degrees opening are adjusted on the basis of images taken through the respective lens devices. A situation is not assumed that a lens device that is paired with a lens device that is designed for 3D image taking is an existing lens device of a different kind. In particular, no consideration is given to brightness-related specifications of the respective lens devices.

The present invention has been made in the above circumstances, and an object of the invention is therefore to take a 3D image smoothly with brightness levels of lens devices equalized even in the case where a lens device that is designed for 3D image taking is combined with any of various existing lens devices that are of different kinds than it.

Means for Solving the Problems

A lens control device which controls the lens devices provided in a 3D camera which takes a 3D image using a first lens device for 3D image taking and a second lens device which is made usable for 3D image taking when connected to the first lens device, comprising a lens particulars acquiring unit for acquiring respective zoom movable ranges of the first lens device and the second lens device and brightness controllable ranges at respective focal lengths of each of the zoom movable ranges; a zoom range setting unit for setting a common zoom range of the first lens device and the second lens device on the basis of the acquired zoom movable ranges of the respective lens devices; a brightness range setting unit for setting common brightness control ranges of the first lens device and the second lens device at respective focal lengths included in the common zoom range; and a lens operation restricting unit for performing a control so that a zoom position signal corresponding to a target focal length of the first lens device included in the common zoom range and a brightness control signal corresponding to target brightness of the first lens device included in the common brightness control range at the target focal length are sent from the first lens device to the second lens device.

A lens control method for controlling the lens devices provided in a 3D camera which takes a 3D image using a first lens device for 3D image taking and a second lens device which is made usable for 3D image taking when connected to the first lens device, comprising: acquiring respective zoom movable ranges of the first lens device and the second lens device and brightness controllable ranges at respective focal lengths of each of the zoom movable ranges; setting a common zoom range of the first lens device and the second lens device on the basis of the acquired zoom movable ranges of the respective lens devices; setting common brightness control ranges of the first lens device and the second lens device at respective focal lengths included in the common zoom range; and performing a control so that a zoom position signal corresponding to a target focal length of the first lens device included in the common zoom range and a brightness control signal corresponding to target brightness of the first lens device included in the common brightness control range at the target focal length are sent from the first lens device to the second lens device.

Advantages of the Invention

Even in the case where a lens device that is designed for 3D image taking is combined with any of various existing lens devices that are of different kinds than it, the invention makes it possible to cause the existing lens device to operate in link with an operation of the lens device for 3D image taking by determining, in advance, common brightness ranges at respective focal lengths where a 3D image can be taken. This makes it possible to take a 3D image smoothly.

MODES FOR CARRYING OUT THE INVENTION

An embodiment of the present invention will be hereinafter described with reference to the drawings.

Figure 1:
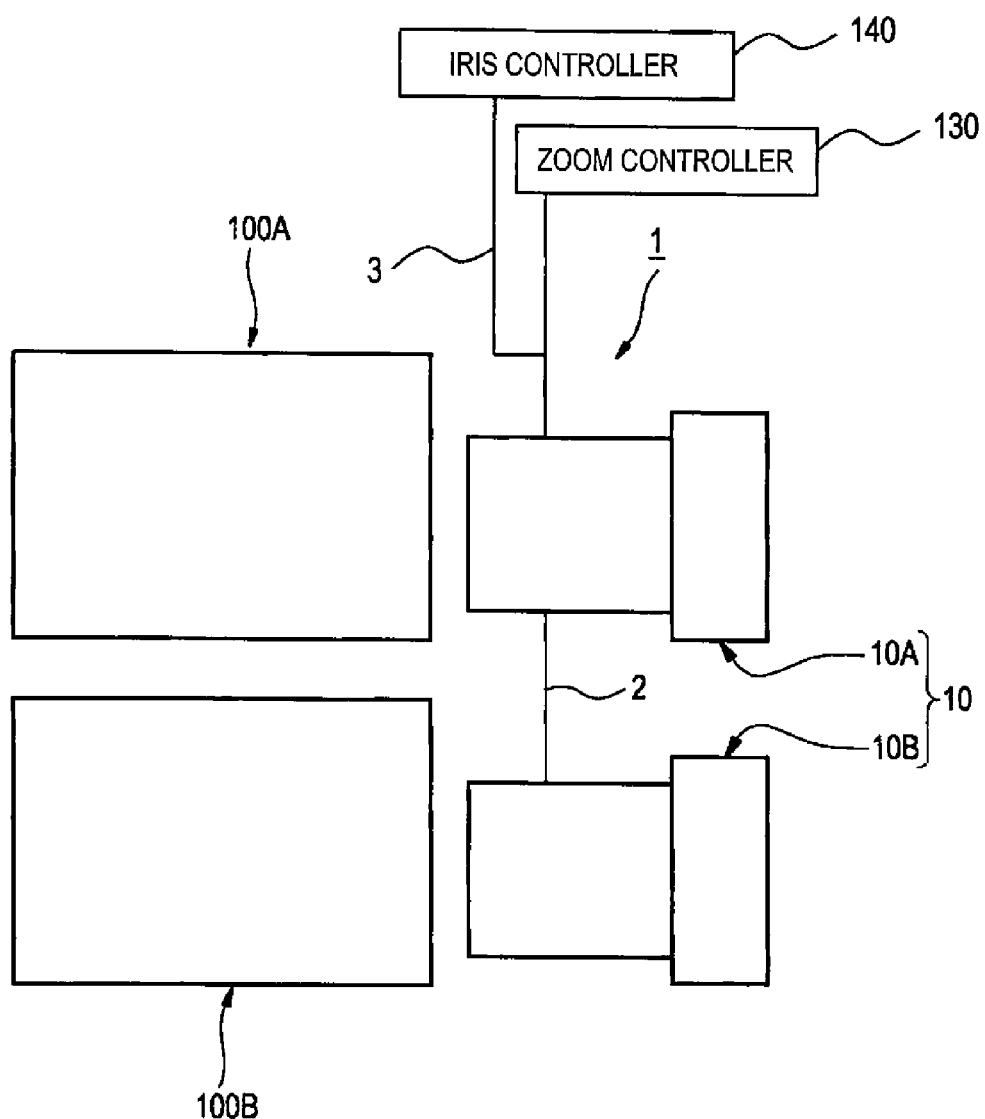
FIG. 1 is a drawing for description of an embodiment of the present invention which shows a general configuration of a camera system.

FIG. 1 is a block diagram for description of the embodiment of the invention which shows the overall configuration of a camera system.

As shown in FIG. 1, the camera system 1 is configured so as to include camera main bodies 100A and 100B, a 3D camera lens system 10, a zoom controller 130, and an iris controller 140. The camera system 1 is mainly used for taking of a 3D image.

The lens system 10 includes two lens devices 10A and 10B. The lens devices 10A and 10B are mounted on the camera main bodies 100A and 100B, respectively. For example, the lens devices 10A and 10B are used for taking left-eye video and right-eye video, respectively.

In the lens system 10, the two lens devices 10A and 10B are connected to each other by a connection cable 2 which functions as a communication means.

The camera main body 100A incorporates an imaging device such as a CCD imaging device, a prescribed signal processing circuit, etc. (not shown). An image formed by the lens device 10A is photoelectrically converted by the imaging device, subjected to prescribed signal processing by the signal processing circuit, and output to the outside from, for example, a video signal output terminal of the camera main body 100A in the form of a video signal of the HDTV scheme (HDTV signal).

Likewise, the camera main body 100B incorporates an imaging device such as a CCD imaging device, a prescribed signal processing circuit, etc. An image formed by the lens device 10B is photoelectrically converted by the imaging device, subjected to prescribed signal processing by the signal processing circuit, and output to the outside from, for example, a video signal output terminal of the camera main body 100B in the form of a video signal of the HDTV scheme (HDTV signal).

The zoom controller 130 is connected to the lens device 10A by a connection cable 3 which functions as a communication means. A zoom manipulation signal for changing the zoom position of the lens device 10A is output and sent from the zoom controller 130.

Furthermore, the iris controller 140 is connected to the lens device 10A by the connection cable 3. An iris manipulation signal for changing the f-number is output and sent from the iris controller 140.

Figure 2:
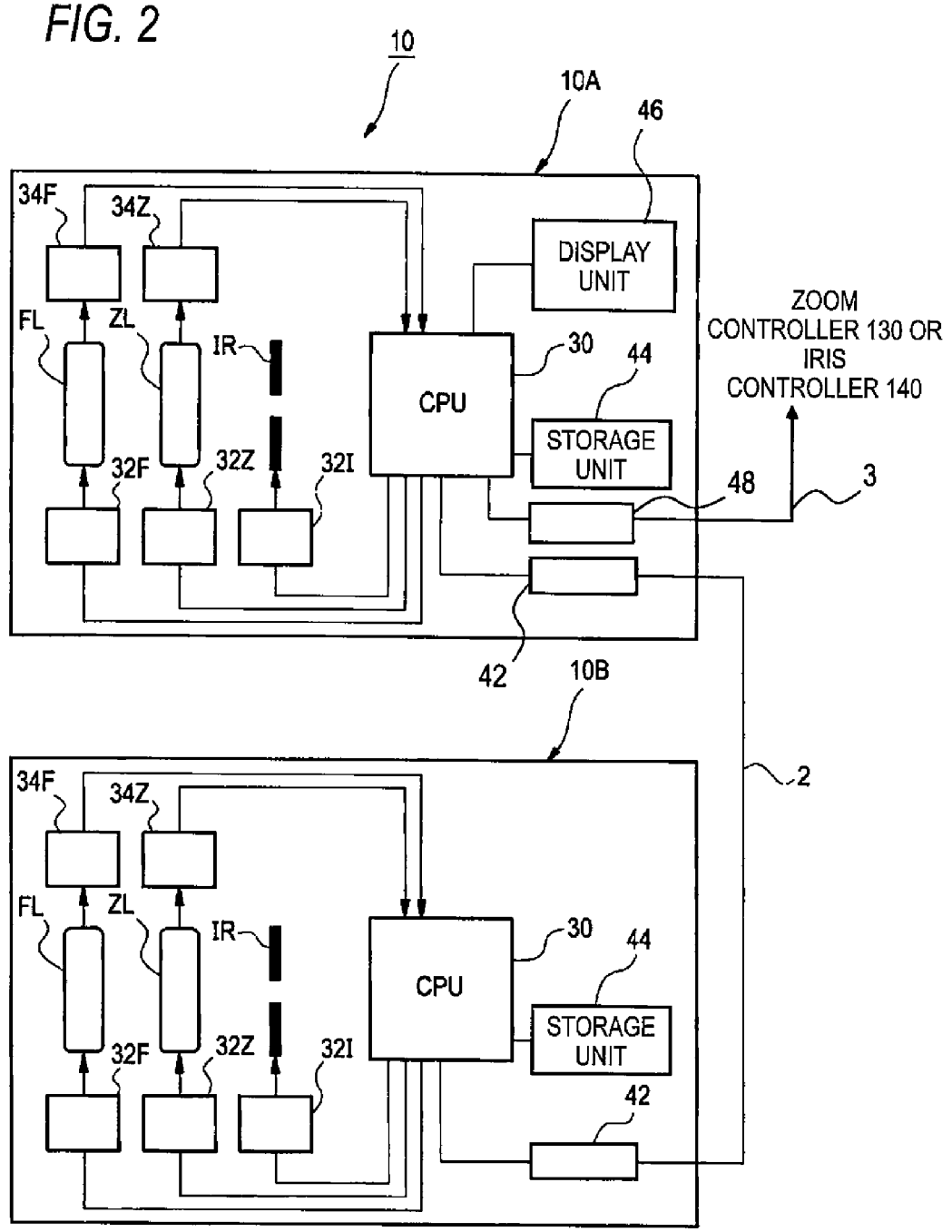
FIG. 2 is a drawing for description of a lens system of the camera system shown in FIG. 1.

FIG. 2 is a drawing for description of the lens system of the camera system shown in FIG. 1.

As shown in FIG. 2, each of the lens devices 10A and 10B of the lens system 10 is composed of an optical system (shooting lens) and a control system (control unit). The lens device 10A is a lens device provided for taking of a solid image. On the other hand, the lens device 10B is an existing lens device that is of a different kind than the lens device 10A, and can be used for 3D image taking only when connected to the lens device 10A by the connection cable 2. Although the figure shows the lens device 10B as an example, an arbitrary lens device can be used as long as it can send and receive information to and from the lens device 10A. For convenience of description, elements having the same function are given the same symbol. In the following, the elements of the lens device 10A will mainly be described. And elements of the lens device 10B for which corresponding ones having the same functions exist in the lens device 10A are regarded as identical to the latter and will not be described where appropriate.

In the optical system (shooting lens) of the lens device 10A, optical components such as a focus lens group FL, a zoom lens group ZL, an iris IR, and a master lens group (not shown) are provided inside a lens barrel. The focus lens group FL and the zoom lens group ZL are disposed so as to be able to move in the front-rear direction along the optical axis. A focus adjustment (subject distance adjustment) is performed by adjusting the position of the focus lens group FL, and a zoom adjustment (focal length adjustment) is performed by adjusting the position of the zoom lens group ZL. A light quantity adjustment is performed by adjusting the position of the iris IR (degree of opening). Subject light that has shined on the shooting lens and passed through these lens groups is image-formed on the imaging surface of the imaging device which is disposed in the camera main body 100A shown in FIG. 1.

The control system of the lens device 10A is equipped with a CPU 30 which controls the entire optical system in a unified manner, a focus lens drive unit 32F which supplies drive force for changing the position of the focus lens group FL, a zoom lens drive unit 32Z which supplies drive force for changing the position of the zoom lens group ZL, an iris drive unit 32I which supplies drive force for changing the light quantity using the iris IR. Each drive unit is equipped with a drive motor (not shown) and an amplifier (not shown) which supplies drive power to the drive motor.

The lens device 10A is equipped with a communication connection unit 42 to which the connection cable 2 is connected, a storage unit 44 such as a memory, a display unit 46, and a communication connection unit 48 to which the connection cable 3 is connected.

The communication connection unit 42 is an interface for connection to another lens device (in this example, the lens device 10B), and may be of a serial communication scheme such as RS-232. The lens device 10A sends and receives information relating to a zoom position (focal length) or information relating to an f-number to and from another lens device through the communication connection unit 42.

The storage unit 44 stores identification information that is specific to the lens device 10A and various tables that are necessary in controlling the lens device 10A and the lens device 10B. For example, the storage unit 44 stores a connection list of lens devices that were connected to the lens device 10A before. The storage unit 44 may also store correction data etc. to be used in taking or reproducing a 3D image.

A function to be performed in a brightness adjustment setting mode or a brightness linkage control of a 3D image operation mode (described later) is realized by running, mainly by the CPU 30 of the lens device 10A, a program installed in the storage unit 44 of the lens device 10A.

The display unit 46 displays information indicating an operation status of focusing, zooming, or another kind of operation, or another kind of status of the lens device 10A. The display unit 46 may be an LCD or an LED display, for example.

The communication connection unit 48 is an interface for connection to other external devices (in this example, the zoom controller 130 and the iris controller 140), and may be of a serial communication scheme such as RS-485. The lens device 10A is configured so as to send and receive information relating to a zoom manipulation to and from the zoom controller 130 through the communication connection unit 48 and to send and receive information relating to an iris manipulation to and from the iris controller 140 through the communication connection unit 48. The communication connection unit 48 may be configured so as to enable connection of a connection cable for connection to yet another external device.

The control system of the lens device 10A is also provided with an encoder 34F which is linked to the focus lens group FL and an encoder 34Z which is linked to the zoom lens group ZL.

The focus lens group FL, the zoom lens group ZL, and the iris IR are driven by the focus lens drive unit 32F, the zoom lens drive unit 32Z, and the iris drive unit 32I, respectively, on the basis of signals supplied from the CPU 30, and thereby controlled to states that conform to target shooting conditions.

Like the lens device 10A, the lens device 10B is equipped with a communication connection unit 42 to which the connection cable 2 is connected and a storage unit 44 such as a memory. Although in FIG. 3 the lens device 10B is not equipped with a display unit, the lens device 10B may be equipped with a display unit.

Figure 3:
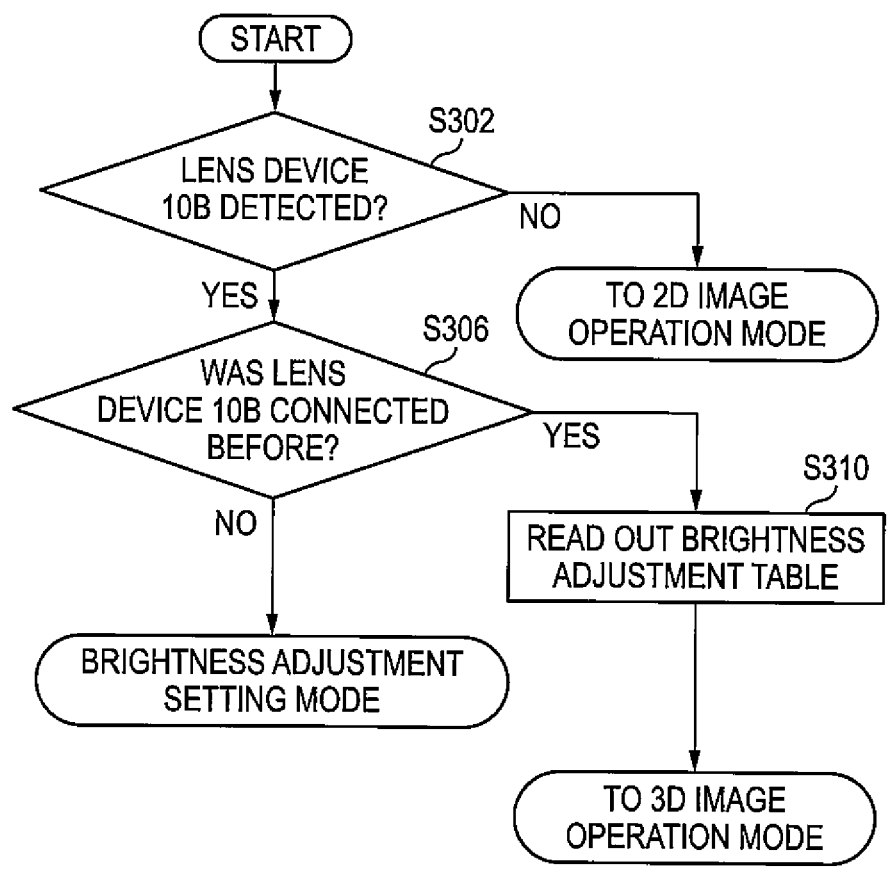
FIG. 3 is a flowchart of a mode setting control which is performed when an existing lens device has been connected to the lens system.

FIG. 3 is a flowchart of a mode setting control which is performed when an existing lens device has been connected to the lens system.

When the lens device 10B has been connected by the connection cable 2, the lens device 10A detects the connection of the lens device 10B (S302).

If the lens device 10B has not been connected and hence is not detected (S302: no), the lens device 10A continues a 2D image operation mode in which a 2D image is taken using only the lens device 10A (the lens device 10B is not used).

On the other hand, if the lens device 10B has been connected and hence its connection is detected (S302: yes), the lens device 10A receives identification information that is specific to the lens device 10B and judges whether or not the lens device 10B was connected to the lens device 10A before on the basis of the specific identification information by referring to the connection list of lens devices stored in the storage unit 44 (S306).

If judging that the lens device 10B was not connected to the lens device 10A before (S306: no), the lens device 10A makes a transition to a brightness adjustment setting mode (described later; see FIG. 4).

On the other hand, if judging that the lens device 10B was connected to the lens device 10A before (S306: yes), the lens device 10A reads, from the storage unit 44, a brightness adjustment table which contains a common zoom range of the lens device 10A and the lens device 10B and common brightness control ranges at respective focal lengths included in the common zoom range (S310).

Then, after making, for the lens device 10A and the lens device 10B, initial settings such as reading of various other tables etc. necessary for 3D image taking, the lens device 10A makes a transition to a 3D image operation mode in which to take a 3D image using both of the lens device 10A and the lens device 10B.

Figure 4:
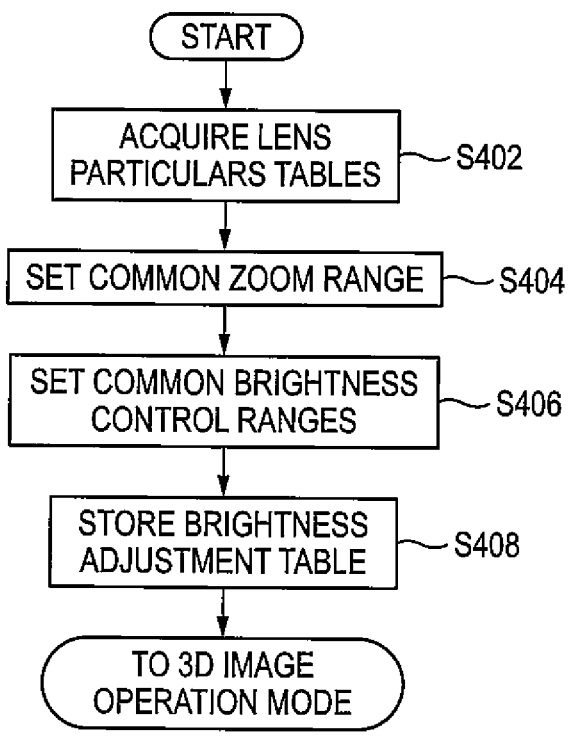
FIG. 4 is a flowchart of a control which is performed in a brightness adjustment setting mode.

FIG. 4 is a flowchart of a control which is performed in the brightness adjustment setting mode.

First, the lens device 10A acquires lens particulars tables each of which contains a zoom movable range of a lens device and brightness controllable ranges at respective focal lengths included in each zoom movable range (S402). More specifically, the lens device 10A reads a lens particulars table of the lens device 10A from the storage unit 44. Furthermore, the lens device 10A receives a lens particulars table of the lens device 10B via the connection cable 2.

Then, the lens device 10A sets a common zoom range by referring to the lens particulars tables of the respective lens devices (S404). More specifically, the lens device 10A acquires a focal length corresponding to a zoom position that is closest to the wide-angle-side end of the lens device 10A from the lens particulars table of the lens device 10A and acquires a focal length corresponding to a zoom position that is closest to the wide-angle-side end of the lens device 10B from the lens particulars table of the lens device 10B. The lens device 10A sets, as a lower limit value of a common zoom range, a larger one of the acquired focal lengths of the respective lens devices. And the lens device 10A acquires a focal length corresponding to a zoom position that is closest to the tele-side end of the lens device 10A from the lens particulars table of the lens device 10A and acquires a focal length corresponding to a zoom position that is closest to the tele-side end of the lens device 10B from the lens particulars table of the lens device 10B. The lens device 10A sets, as an upper limit value of the common zoom range, a shorter one of the acquired focal lengths of the respective lens devices.

Then, the lens device 10A sets common brightness control ranges at respective focal lengths included in the thus-set common zoom range (S406). More specifically, the lens device 10A acquires 1/(open f-number) values of the lens device 10A and 1/(open f-number) values of the lens device 10B at respective focal lengths included in the common zoom range. The lens device 10A compares the 1/(open f-number) values of the respective lens devices and sets, as an upper limit value of each common brightness control range, a smaller one of the 1/(open f-number) values of the respective lens devices.

Then, the lens device 10A stores, in the storage unit 44, a brightness adjustment table which contains the common zoom range of the lens devices 10A and 10B and the common brightness control ranges at the respective focal lengths included in the common zoom range (S408). Then, the lens device 10A makes a transition to the 3D image operation mode.

Figure 5:
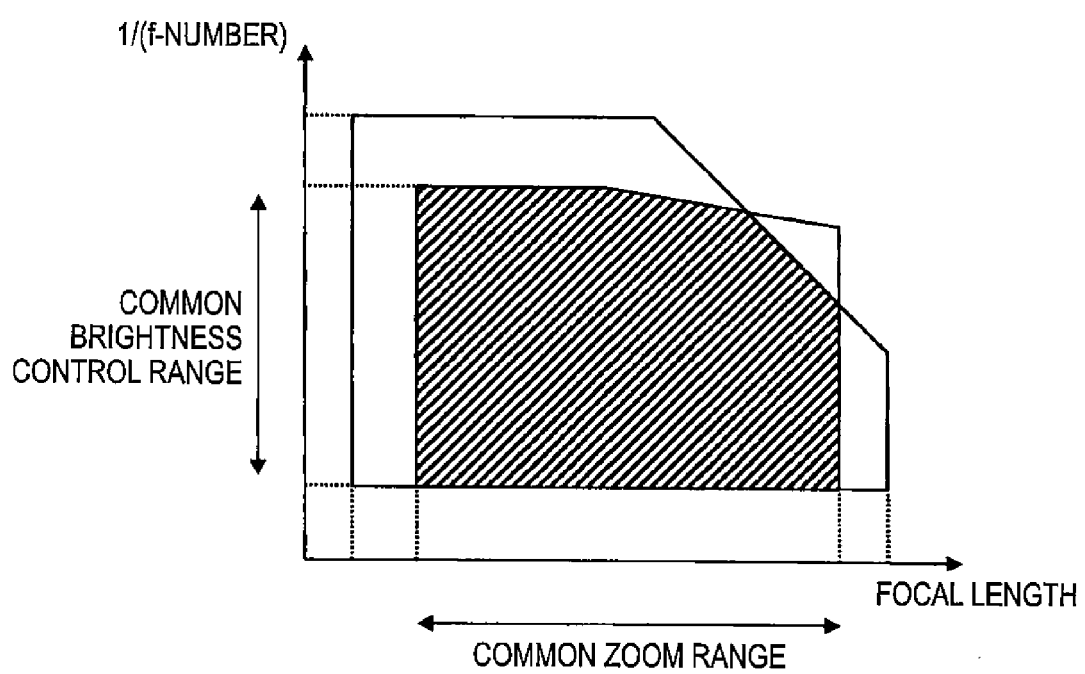
FIG. 5 is a schematic diagram illustrating an example set of a common zoom range and common brightness control ranges.

FIG. 5 is a schematic diagram illustrating an example set of a common zoom range and common brightness control ranges.

In FIG. 5, the horizontal axis represents the focal length and the vertical axis represents 1/f-number. The hatched region is a range where brightness adjustment can be performed in taking of a 3D image. A common zoom range is set along the horizontal axis and common brightness control ranges are set along the vertical axis.

For each focal length, a common brightness control range may be set so as not to include brightness information representing a brightness range that is lower than a prescribed brightness level. In this case, for each focal length, a prescribed value (e.g., 1/32) is set as a lower limit value of a common brightness control range. This enables a restriction that 3D image taking is prohibited when images obtained from the respective lens devices 10A and 10B are very dark.

Figure 6:
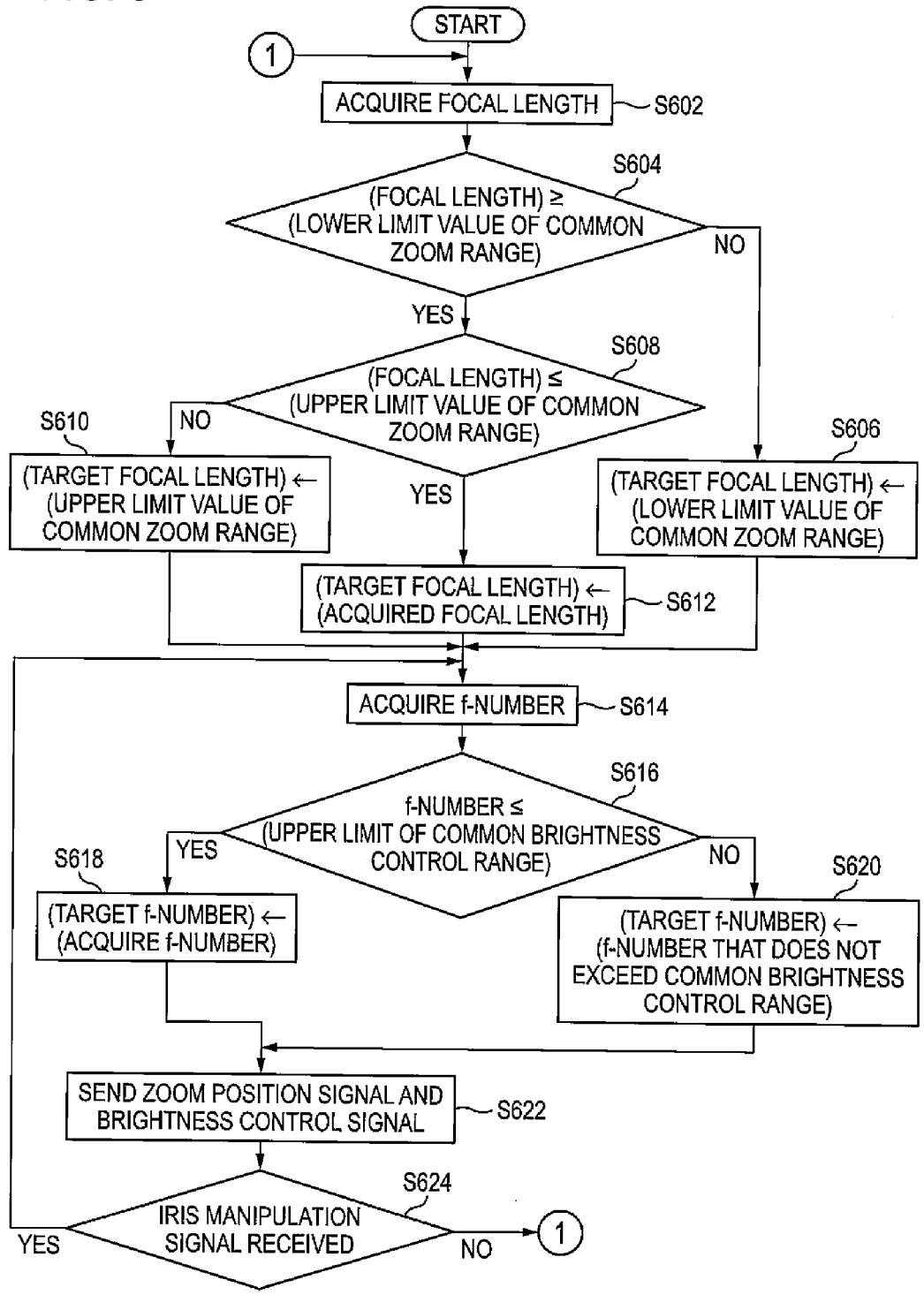
FIG. 6 is a flowchart of a brightness linkage control which is performed in a 3D image operation mode.

FIG. 6 is a flowchart of a brightness linkage control which is performed in the 3D image operation mode.

When receiving a zoom manipulation signal from the zoom controller 130, the lens device 10A acquires a target zoom position to which the zoom lens group Z1, of the lens device 10A should be moved from the received zoom manipulation signal and acquires a focal length of the lens device 10A corresponding to the target zoom position (S602).

Then, the lens device 10A judges whether or not the acquired focal length of the lens device 10A is included in the common zoom range.

More specifically, the lens device 10A judges whether or not the focal length is larger than or equal to the lower limit value of the common zoom range (S604).

If the focal length is smaller than the lower limit value of the common zoom range (S604: no), the lens device 10A employs the lower limit focal length of the common zoom range as a target focal length of the lens device 10A (S606).

On the other hand, if the focal length that has been acquired on the basis of the zoom manipulation signal is larger than or equal to the lower limit value of the common zoom range (S604: yes), the lens device 10A further judges whether or not this focal length is smaller than or equal to the upper limit value of the common zoom range (S608).

If the focal length that has been acquired on the basis of the zoom manipulation signal is larger than the upper limit value of the common zoom range (S608: no), the lens device 10A employs the upper limit value of the common zoom range as a target focal length of the lens device 10A (S610).

On the other hand, if the focal length is smaller than or equal to the upper limit value of the common zoom range (S608: yes), since the focal length that has been acquired on the basis of the zoom manipulation signal is included in the common zoom range, the lens device 10A employs, as a target focal length, the focal length that has been acquired on the basis of the zoom manipulation signal (S612).

Then, the lens device 10A acquired an f-number of the lens device 10A (S614).

Then, the lens device 10A judges whether or not the f-number of the lens device 10A conforms to the common brightness control range at the target focal length.

More specifically, the lens device 10A judges whether or not the reciprocal (1/f-number) of the acquired f-number is smaller than or equal to the upper limit value of the common brightness control range at the target focal length (S616).

If the 1/f-number value is smaller than or equal to the upper limit value of the common brightness control range (S616: yes), the lens device 10A employs the f-number acquired at step 5614 as a target f-number because this f-number indicates brightness that can be applied to both of the lens devices 10A and 10B (S618).

On the other hand, if the 1/f-number value is larger than the upper limit value of the common brightness control range (S616: no), the lens device 10A employs, as a target f-number, an f-number whose reciprocal is smaller than the upper limit value of the common brightness control range at the target focal length that can be set in the lens device 10A (S620).

Then, the lens device 10A sends a zoom position signal for the lens device 10B corresponding to the determined target focal length and a brightness control signal for the lens device 10B corresponding to the determined target f-number to the lens device 10B via the connection cable 2 (S622). After sending those signals, the lens device 10A performs a zooming control and an iris control on the basis of a zoom position signal corresponding to the determined target focal length and a brightness control signal. The lens device 10B performs a zooming control and an iris control on the basis of the zoom position signal and the brightness control signal that are received via the connection cable 2.

When thereafter receiving an iris manipulation signal from the iris controller 140 (S624: yes), the lens device 10A again acquires a changed f-number on the basis of the iris manipulation signal (S614). The lens device 10A again judges whether or not the f-number of the lens device 10A conforms to the common brightness control range and performs controls so that the f-numbers of the respective lens devices come close to each other.

On the other hand, if not receiving an iris manipulation signal from the iris controller 140 (e.g., if receiving a zoom manipulation signal again; S624: no), the lens device 10A returns to S602 and performs zoom positioning.

Where lower limit values of a common brightness control range are set at the respective focal lengths, whether or not the 1/f-number value is larger than or equal to the lower limit value of the common brightness control range may be judged after S616. If the 1/f-number value is smaller than the lower limit value of the common brightness control range, the lower limit value of the common brightness control range may be employed as a target f-number.

As described above, in this lens system 10, when a replaceable lens device 10B which is of a different kind than the lens device 10A for 3D image taking is connected to the lens device 10A, a range that enables taking of a 3D image is determined for future controls. This makes it possible to perform controls so that brightness obtained with the lens device 10B is equalized to brightness obtained with the lens device 10A even when a zoom manipulation or an iris manipulation has been performed on the lens device 10A. Thus, a 3D image can be taken smoothly.

Since the lens device 10A is given the brightness adjustment function, a brightness linkage control can be performed smoothly in taking of a 3D image when the lens device 10B is again connected to the lens device 10A which is designed for 3D image taking.

While the lens device 10B is not connected, ordinary shooting (taking of a non-3D image) can be performed using the lens device 10A. As such, the lens device 10A can be used differently depending on the situation.

Although in this lens system 10 common brightness control ranges are set using open f-numbers, common brightness control ranges may be set using T-numbers in which transmittance of each of the lens devices 10A and 10B is also taken into consideration.

This makes it possible to equalize brightness levels obtained with the respective lens devices 10A and 105 with even higher accuracy.

Although this lens system 10 employs the iris for brightness adjustment, a variable ND filter may be used instead. Gain adjustment or the like may also be performed on the camera main body side in the case where images that are completely identical in brightness cannot be obtained because of differences in lens particulars.

Although the lens control device according to the invention has been described above in detail, it goes without saying that the invention is not limited to the above example and various improvements and modifications may be made without departing from the gist of the invention.

As described above, this specification discloses the following items:

(1) A lens control device which controls the lens devices provided in a 3D camera which takes a 3D image using a first lens device for 3D image taking and a second lens device which is made usable for 3D image taking when connected to the first lens device, comprising a lens particulars acquiring unit for acquiring respective zoom movable ranges of the first lens device and the second lens device and brightness controllable ranges at respective focal lengths of each of the zoom movable ranges; a zoom range setting unit for setting a common zoom range of the first lens device and the second lens device on the basis of the acquired zoom movable ranges of the respective lens devices; a brightness range setting unit for setting common brightness control ranges of the first lens device and the second lens device at respective focal lengths included in the common zoom range; and a lens operation restricting unit for performing a control so that a zoom position signal corresponding to a target focal length of the first lens device included in the common zoom range and a brightness control signal corresponding to target brightness of the first lens device included in the common brightness control range at the target focal length are sent from the first lens device to the second lens device.

(2) The lens control device according to item (1), wherein it is incorporated in the first lens device.

(3) The lens control device according to item (2), wherein the lens particulars acquiring unit acquires a zoom movable range and a brightness controllable range of the second lens device from the second lens device through a communication.

(4) The lens control device according to any one of items (1) to (3), further comprising a connection detecting unit for detecting that the second lens device has been connected to the first lens device; and a mode switching unit for switching, according to whether the second lens device is connected or not, between a first operation mode in which an operation control for 3D image taking which uses the first lens device and the second lens device is performed and a second operation mode in which an operation control for image taking which uses only the first lens device is performed, wherein the mode switching unit makes switching from the second operation mode to the first operation mode if the connection detecting unit detects connection of the second lens device.

(5) The lens control device according to any one of items (1) to (4), wherein the lens operation restricting unit restricts the target brightness of the first lens device so that it comes to be included in the common brightness control range if it is out of the common brightness control range.

(6) The lens control device according to any one of items (1) to (5), wherein the brightness range setting unit makes a setting so that a brightness range that is lower than a prescribed brightness level is excluded from the common brightness control range.

(7) The lens control device according to any one of item (1) to (6), wherein the brightness range setting unit sets a common brightness control range using open f-numbers of the lens devices at each focal length.

(8) The lens control device according to item (7), wherein the brightness range setting unit sets a common brightness control range using T-numbers of the lens devices at each focal length.

(9) A lens control method for controlling the lens devices provided in a 3D camera which takes a 3D image using a first lens device for 3D image taking and a second lens device which is made usable for 3D image taking when connected to the first lens device, comprising the steps of acquiring respective zoom movable ranges of the first lens device and the second lens device and brightness controllable ranges at respective focal lengths of each of the zoom movable ranges; setting a common zoom range of the first lens device and the second lens device on the basis of the acquired zoom movable ranges of the respective lens devices; setting common brightness control ranges of the first lens device and the second lens device at respective focal lengths included in the common zoom range; and performing a control so that a zoom position signal corresponding to a target focal length of the first lens device included in the common zoom range and a brightness control signal corresponding to target brightness of the first lens device included in the common brightness control range at the target focal length are sent from the first lens device to the second lens device.

INDUSTRIAL APPLICABILITY

Even in the case where a lens device that is designed for 3D image taking is combined with any of various existing lens devices that are of different kinds than it, the invention makes it possible to cause the existing lens device to operate in link with an operation of the lens device for 3D image taking by determining, in advance, common brightness ranges at respective focal lengths where a 3D image can be taken. This makes it possible to take a 3D image smoothly.

Although the invention has been described in detail by referring to the particular embodiment, it is apparent to those skilled in the art that various changes and modifications are possible without departing from the spirit and scope of the invention.

DESCRIPTION OF SYMBOLS

1 . . . Camera system
2, 3, . . . Connection cable
10 . . . Lens system
10A, 10B . . . Lens device
100A, 100B . . . Camera main body
130 . . . Zoom controller
140 . . . Iris controller

The invention claimed is:

1. A lens control device which controls lens devices provided in a 3D camera which takes a 3D image using a first lens device for 3D image taking and a second lens device which is made usable for 3D image taking when connected to the first lens device, comprising:

a lens particulars acquiring unit for acquiring respective zoom movable ranges of the first lens device and the second lens device and brightness controllable ranges at respective focal lengths of each of the zoom movable ranges;

a zoom range setting unit for setting a common zoom range of the first lens device and the second lens device on the basis of the acquired zoom movable ranges of the respective lens devices;

a brightness range setting unit for setting common brightness control ranges of the first lens device and the second lens device at respective focal lengths included in the common zoom range; and a lens operation restricting unit for performing a control so that a zoom position signal corresponding to a target focal length of the first lens device included in the common zoom range and a brightness control signal corresponding to target brightness of the first lens device included in the common brightness control range at the target focal length are sent from the first lens device to the second lens device.

2. The lens control device according to claim 1, wherein the lens control device is incorporated in the first lens device.

3. The lens control device according to claim 2, wherein the lens particulars acquiring unit acquires a zoom movable range and a brightness controllable range of the second lens device from the second lens device through a communication.

4. The lens control device according to claim 1, further comprising:
   a connection detecting unit for detecting that the second lens device has been connected to the first lens device; and
   a mode switching unit for switching, according to whether the second lens device is connected or not, between a first operation mode in which an operation control for 3D image taking which uses the first lens device and the second lens device is performed and a second operation mode in which an operation control for image taking which uses only the first lens device is performed,
   wherein the mode switching unit makes switching from the second operation mode to the first operation mode if the connection detecting unit detects connection of the second lens device.

5. The lens control device according to claim 1, wherein the lens operation restricting unit restricts the target brightness of the first lens device so that it comes to be included in the common brightness control range if it is out of the common brightness control range.

6. The lens control device according to claim 1, wherein the brightness range setting unit makes a setting so that a brightness range that is lower than a prescribed brightness level is excluded from the common brightness control range.

7. The lens control device according to claim 1, wherein the brightness range setting unit sets a common brightness control range using open f-numbers of the lens devices at each focal length.

8. The lens control device according to claim 7, wherein the brightness range setting unit sets a common brightness control range using T-numbers of the lens devices at each focal length.

9. A lens control method for controlling the lens devices provided in a 3D camera which takes a 3D image using a first lens device for 3D image taking and a second lens device which is made usable for 3D image taking when connected to the first lens device, comprising:
   acquiring respective zoom movable ranges of the first lens device and the second lens device and brightness controllable ranges at respective focal lengths of each of the zoom movable ranges;
   setting a common zoom range of the first lens device and the second lens device on the basis of the acquired zoom movable ranges of the respective lens devices;
   setting common brightness control ranges of the first lens device and the second lens device at respective focal lengths included in the common zoom range; and
   performing a control so that a zoom position signal corresponding to a target focal length of the first lens device included in the common zoom range and a brightness control signal corresponding to target brightness of the first lens device included in the common brightness control range at the target focal length are sent from the first lens device to the second lens device.

* * * * *